United States Patent
Gagneraud (10) Patent No.: US 8,970,663 B2
(45) Date of Patent: Mar. 3, 2015

(54) 3D VIDEO CONFERENCE

(75) Inventor: Eric Gagneraud, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 359 days.

(21) Appl. No.: 13/387,113

(22) PCT Filed: Dec. 7, 2009

(86) PCT No.: PCT/US2009/066921
§ 371 (c)(1),
(2), (4) Date: Jan. 25, 2012

(65) Prior Publication Data
US 2012/0120183 A1    May 17, 2012

(51) Int. Cl.
*H04N 7/14* (2006.01)

(52) U.S. Cl.
USPC .................................... 348/14.16; 348/14.15

(58) Field of Classification Search
USPC .......... 348/14.01, 14.08, 14.12, 14.16, 14.15, 348/14.07
See application file for complete search history.

(56) References Cited

U.S. PATENT DOCUMENTS

| | | | |
|---|---|---|---|
| 6,980,697 B1 | 12/2005 | Basso et al. | |
| 7,129,981 B2 * | 10/2006 | Berstis | 348/333.12 |
| 8,063,929 B2 * | 11/2011 | Kurtz et al. | 348/14.08 |
| 2003/0218672 A1 * | 11/2003 | Zhang et al. | 348/14.16 |
| 2006/0285832 A1 | 12/2006 | Huang | |
| 2007/0171275 A1 * | 7/2007 | Kenoyer | 348/14.08 |
| 2008/0106591 A1 * | 5/2008 | Border et al. | 348/14.01 |
| 2009/0015658 A1 * | 1/2009 | Enstad et al. | 348/14.08 |
| 2009/0096858 A1 * | 4/2009 | Jeong | 348/14.02 |
| 2009/0245600 A1 * | 10/2009 | Hoffman et al. | 382/128 |
| 2009/0256904 A1 * | 10/2009 | Krill et al. | 348/47 |
| 2010/0149310 A1 * | 6/2010 | Zhang et al. | 348/14.16 |
| 2010/0225735 A1 * | 9/2010 | Shaffer et al. | 348/14.08 |
| 2011/0085017 A1 * | 4/2011 | Robinson et al. | 348/14.08 |
| 2011/0102538 A1 * | 5/2011 | Tan | 348/14.08 |
| 2012/0320141 A1 * | 12/2012 | Bowen et al. | 348/14.02 |
| 2012/0320147 A1 * | 12/2012 | Kirby et al. | 348/14.16 |

OTHER PUBLICATIONS

ISA/KR, International Search Report dated Aug. 26, 2010, PCT/US2009/066921, filed Dec. 7, 2009.

Oliver Schreer, et al., "3DPresence—A system concept for muiti-user and multi-party immersive 3D videoconferencing", 5th European Conf. on Visual Media Production (CVMP 2008), London, UK, Nov. 2008.

Oliver Schreer, et al., "A Virtual 3D Video-Conference System Providing Semi-irnmersive Telepresence: A Real-Time Solution in Hardware and Software", Proceedings of eBusiness and eWork 2001, Venice Oct 2001.

Peter Eisert, "Immersive 3-D video Conferencing: Challenges, Concepts, and Implementations", Proc. SPIE Visual Communications and Image Processing (VCIP). Lugano, Switzerland, Jul. 2003.

\* cited by examiner

*Primary Examiner* — Olisa Anwah
(74) *Attorney, Agent, or Firm* — Hewlett-Packard Patent Department (57) ABSTRACT

A method for rendering a 3D video conference including configuring at least two cameras to track a position of a user, transmitting the position of the user to a participant of the 3D video conference, and rendering for display on a 3D display device parallel participant video streams which have been modified in response to the position of the user.

18 Claims, 7 Drawing Sheets

3D VIDEO CONFERENCE

BACKGROUND

When rendering a video conference, one or more cameras can be configured to capture video streams of one or more participants of the video conference. Once the video streams have been captured, the captured video streams can be shared with additional participants of the video conference and rendered for display on one or more digital display devices as a video conference.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
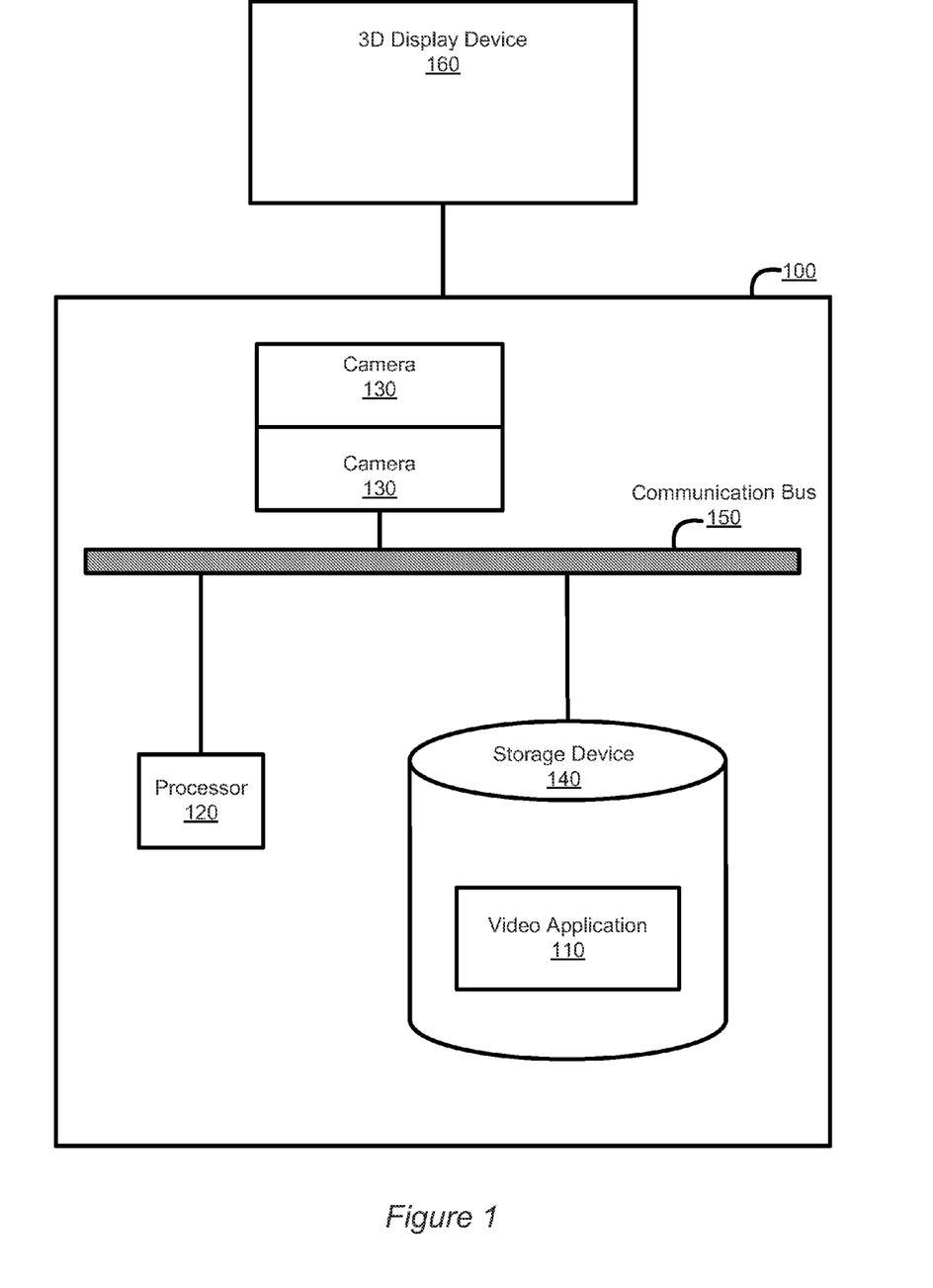
FIG. 1 illustrates a machine coupled to at least two cameras and a 3D display device according to an embodiment of the invention.

FIG. 1 illustrates a machine 100 coupled to at least two cameras 130 and a 3D display device 160 according to an embodiment of the invention. In one embodiment, the machine 100 is a desktop, laptop/notebook, netbook, and/or any other computing device. In another embodiment, the machine 100 is a video conference center and/or the machine 100 is included as part of the video conference center.

As illustrated in FIG. 1, the machine 100 is coupled to at least two cameras 130, a 3D display device 160, a processor 120, a storage device 170, and a communication bus 150 for the machine 100 and/or one or more components of the machine 100 to communicate with one another. Additionally, as illustrated in FIG. 1, the storage device 140 stores a video application 110. In other embodiments, the machine 100 includes additional components and/or is coupled to additional components in addition to and/or in lieu of those noted above and as illustrated in FIG. 1.

As noted above, the machine 100 includes a processor 120. The processor 120 sends data and/or instructions to one or more components of the machine 100, such as the storage device 140, one or more of the cameras 130, the 3D display device 160, and the video application 110. Additionally, the processor 120 receives data and/or instruction from one or more components of the machine 100, such as one or more of the cameras 130 and the video application 110.

The video application 110 is an application which can be utilized in conjunction with the processor 120 and at least two cameras 160 to track a position of a user. When tracking the position of the user, the video application 110 can utilize the cameras 160 to track a head of the user using facial detection technology and/or infra red technology. Additionally, the video application 110 can transmit the position of the user to one or more participants of a 3D video conference.

In response to the position of the user, one or more parallel participant video streams are modified. For the purposes of this application, one or more parallel participant video streams are parallel video streams of the participant which have been captured from at least two participant cameras. Utilizing the modified parallel participant video streams, the video application 110 can render a 3D video conference for display on the 3D display device 160.

The video application 110 can be firmware which is embedded onto the machine 100. In other embodiments, the video application 110 is a software application stored on the machine 100 within ROM or on the storage device 140 accessible by the machine 100 or the video application 110 is stored on a computer readable medium readable and accessible by the machine 100 from a different location.

Additionally, in one embodiment, the storage device 140 is included in the machine 100. In other embodiments, the storage device 140 is not included in the machine 100, but is accessible to the machine 100 utilizing a network interface of the machine 100. The network interface can be a wired or wireless network interface card.

In a further embodiment, the video application 110 is stored and/or accessed through a server coupled through a local area network or a wide area network. The video application 110 communicates with devices and/or components coupled to the machine 100 physically or wirelessly through a communication bus 150 included in or attached to the machine 100. In one embodiment the communication bus 150 is a memory bus. In other embodiments, the communication bus 150 is a data bus.

As noted above, the video application 110 can be utilized in conjunction with the processor 120 and at least two cameras 130 to track a position of a user. For the purposes of this application, a position of the user corresponds to a location of the user when viewing the 3D video conference in front of the 3D display device 160. While viewing the 3D video conference, the position of the user can change and/or be updated in response to the user repositioning in front of the 3D display device 160.

At least two of the cameras 130 are image capturing devices which are configured to capture parallel video streams of the user and can be configured to track the user. When configuring at least of the cameras 130, the video application 110 can send one or more instructions for the cameras 130 to capture parallel video streams of the user and track the user. In another embodiment, the video application 110 can configure the processor 120 to send one or more of the instructions for the cameras 130 to capture parallel video streams of the user and track the user.

Additionally, one or more of the cameras 130 can be configured to reposition when capturing parallel video streams of the user and/or when tracking a position of the user. Further, one or more of the cameras 130 can include one or more camera viewing modes and switch between one or more of the camera viewing modes when capturing parallel video streams of the user and/or when tracking a position of the user. In addition, one or more of the cameras 130 can zoom in and/or out to modify a magnification level of the user when capturing parallel video streams of the user and/or when tracking a position of the user.

In one embodiment, one or more of the cameras 130 can be integrated as part of the machine 100 and/or the 3D display device 160. In another embodiment, one or more of the cameras 130 can be mounted and/or positioned at different positions or locations around the machine 100 and/or the 3D display device 160.

When tracking the position of the user, the video application 110 can use a head or the eyes of the user as a reference point. Additionally, the video application 110 can utilize facial recognition technology and/or infra red technology with the captured parallel video streams of the user to locate and track a location of the user's head or eyes.

The facial detection technology and/or the infra red technology can be hardware based and can be included in one or more of the cameras 130. In another embodiment, the facial detection technology and/or the infra red technology is software based. In other embodiments, the facial detection technology and/or the infra red technology can include both hardware and software technology.

In one embodiment, the video application 110 additionally creates a map of the user's position and updates the map accordingly as the user repositions. As the user repositions in front of the 3D display device 160, the video application 110 can update the position of the user on the map by marking points of where the user currently is and unmarking coordinates of where the user is no longer. As a result, by utilizing the head or eyes of the user as a reference point and by marking points on the map of where the user is, the video application 110 can accurately track and update the location of the user as the user repositions.

While the video application 110 and one or more of the cameras 130 track and update a position of the user, the video application 110 can transmit the position of the user or coordinates from the map to a participant of the 3D video conference. Additionally, the video application 110 can send updates of the user's position to the participant as the user repositions. In one embodiment, the video application 110 additionally transmits the map to the participant. In other embodiments, the video application 110 can send the position or the coordinates to any additional participants of the 3D video conference.

As noted above, in response to receiving the position of the user and/or the coordinates of the position, parallel participant video streams can be modified. When modifying a parallel participant video stream, a magnification level of one or more participant cameras can be modified. Additionally, one or more of the participant cameras can switch camera viewing modes. Further, one or more of the participant cameras can be configured to reposition along and/or around one or more axes.

The participant video cameras are image capturing devices configured to track a position of the participant and capture parallel video streams of the participant. Additionally, one or more of the participant cameras can be controlled remotely by the video application 110 or the video application 110 can send instruction for a machine of the participant to control one or more of the participant cameras.

In other embodiments, when modifying parallel participant video streams, one or more of the parallel participant video streams can be modified by cropping one or more of the parallel participant video streams, scaling one or more of the parallel participant video streams, and/or skewing one or more of the parallel participant video streams. Additionally, one or more of the parallel participant video streams can be modified by the video application 110 once they have been received from the machine of the participant. In other embodiments, one or more of the parallel participant video streams are modified by the machine of the participant before being shared with the video application 110.

Once the parallel participant video streams have been modified, the video application 110 can utilize the modified parallel participant video streams to render the 3D video conference for display on the 3D display device 160. The 3D display device 160 is a display device that can create and/or project one or more images and/or videos for 3D display, such as a 3D video conference. Additionally, the 3D display device 160 can be a monitor and/or a television. In another other embodiments, the 3D display device 160 is a projector that can project one or more images and/or videos.

In one embodiment, the 3D display device 160 utilizes polarized glass as a panel for the 3D display device 160. In other embodiments, the 3D display device 160 can include one or more polarized filters and/or one or more lenticular filters to create the 3D effect. In other embodiments, when viewing the 3D video conference, the user and/or the participant can wear polarized glasses as an accessory.

When rendering the 3D video conference on the 3D display device 160, the video application 110 can synchronize the modified parallel participant video streams to create the 3D video conference. In synchronizing the modified parallel participant video streams, the video application 110 will utilize one of the parallel participant video streams as a left video stream and utilize another parallel participant video stream as a right video stream. As a result, stereo video can be created and rendered on the 3D display device 160 as the 3D video conference. In other embodiments, the video application 110 can utilize additional methods with the modified parallel participant video streams to render the 3D video conference.

As noted above, a position of the participant can be tracked by the participant cameras. Additionally, the position of the participant can be shared with the video application 110. In one embodiment, the position of the participant can be sent to the video application by the machine of the participant. In another embodiment, the video application 110 can remotely access the machine of the participant to access the position of the user.

Utilizing the position of the participant, the video application 110 can proceed to modify one or more parallel video streams of the user in response to the position of the participant. In modifying one or more parallel video streams of the user, the video application 110 can utilizing one or more of the methods disclosed above. Once one or more of the parallel video streams of the user has been modified, the modified parallel video streams can be shared with the participant and the modified parallel video streams of the user can be utilized by the participant for rendering a 3D video conference on a 3D display device of the participant.

Figure 2:
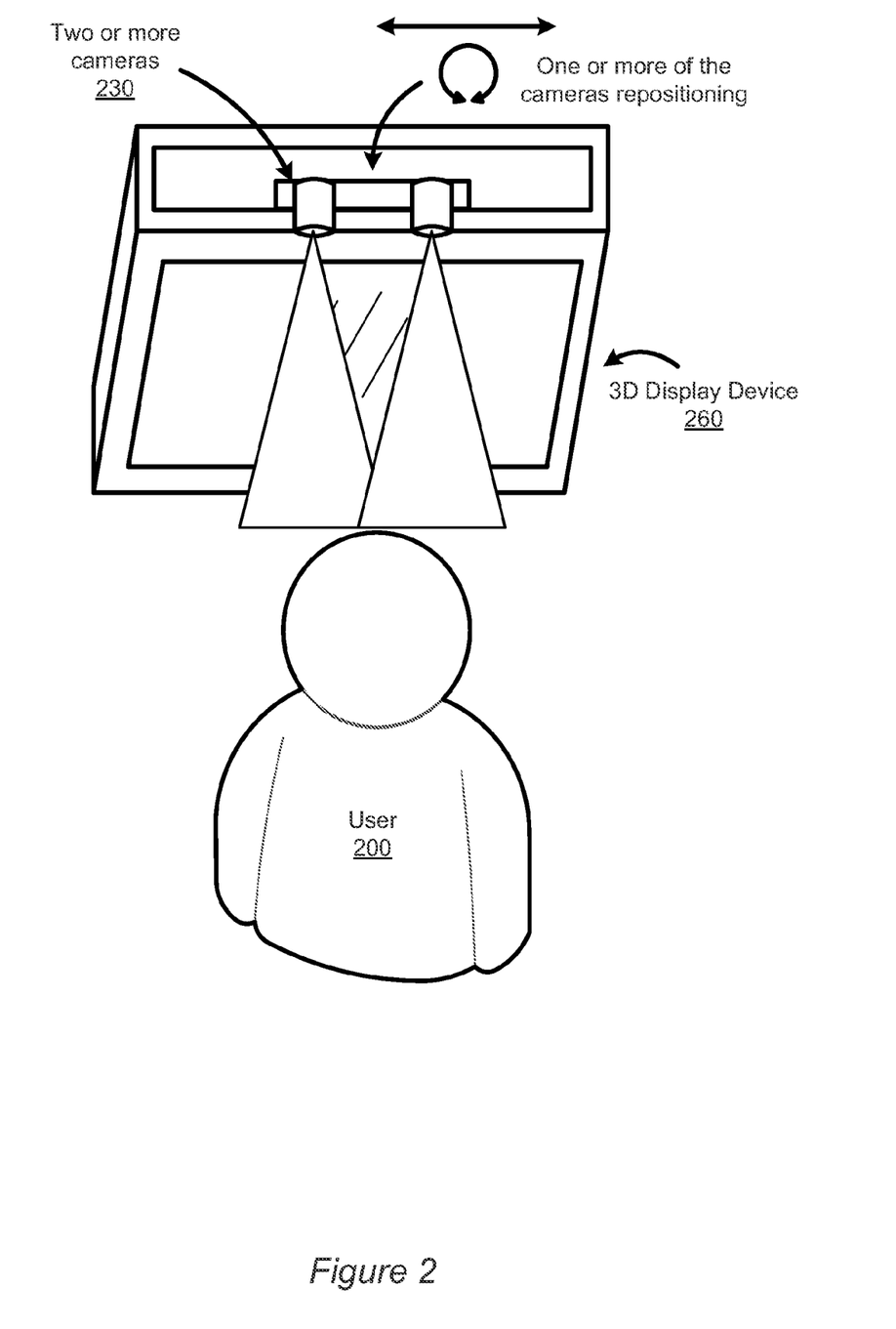
FIG. 2 illustrates at least two cameras coupled to a 3D display device according to an embodiment of the invention.

FIG. 2 illustrates at least two cameras 230 coupled to a 3D display device 260 according to an embodiment of the invention. As illustrated in FIG. 2, in one embodiment, one or more of the cameras 230 can be coupled to the 3D display device 260. In another embodiment, one or more of the cameras 230 can be integrated with the 3D display device 260 and/or a machine coupled to the 3D display device 260. In other embodiments, one or more of the cameras 230 can be located at additional locations in addition to and/or in lieu of those noted above and illustrated in FIG. 2.

As noted above, at least two of the cameras 230 are image capturing devices which can be utilized in conjunction with a video application and/or a processor to capture parallel video streams of the user and to track a position of a user as the user is viewing the 3D video conference. Additionally, as illustrated in FIG. 2, the cameras 230 can be configured to capture a view of the user as parallel video streams of the user. As noted above, when utilizing the cameras 230, the video application can send one or more instructions for the cameras 230 to track to the user and capture parallel video streams of the user. In other embodiments, the video application can instruct a processor to send one or more of the instructions.

Further, as noted above, when tracking the position of the user, the video application and/or one or more of the cameras 230 can utilize face tracking technology and/or infra red technology to track a head or eyes of the user. Additionally, as noted above, the user can reposition in front of the 3D display device 260 during the 3D video conference and the position of the user can be updated. In one embodiment, as the position of the user is tracked and/or updated, the position of the user can be captured on a map with coordinates.

Further, when tracking the position of the user, one or more of the cameras 230 can reposition along and/or around one or more axes. In another embodiment, one or more of the cameras 230 can be configured to switch between one or more camera viewing modes. One or more of the viewing modes can include a wide angle viewing mode. In other embodiments, in modifying a view of the user, one or more of the cameras 230 can be configured to modify a magnification of the view of the user.

One or more of the cameras 230 are configured by the video application to reposition, modify a magnification level, and/or switch to one or more camera viewing modes when the user repositions beyond a default viewing area of one or more of the cameras 230. The default viewing area corresponds to a default position of a camera, a default magnification level of a camera, and/or a default viewing mode of a camera.

As the position and/or location of the user is identified and/or updated by the video application, the video application can transmit the position and/or updates of the position of the user to a participant of the 3D video conference.

In other embodiments, one or more of the cameras 230 are configured to reposition, modify a magnification level, and/or switch to one or more camera viewing modes when modifying one or more parallel video streams of the user in response to a position of a participant.

Figure 3:
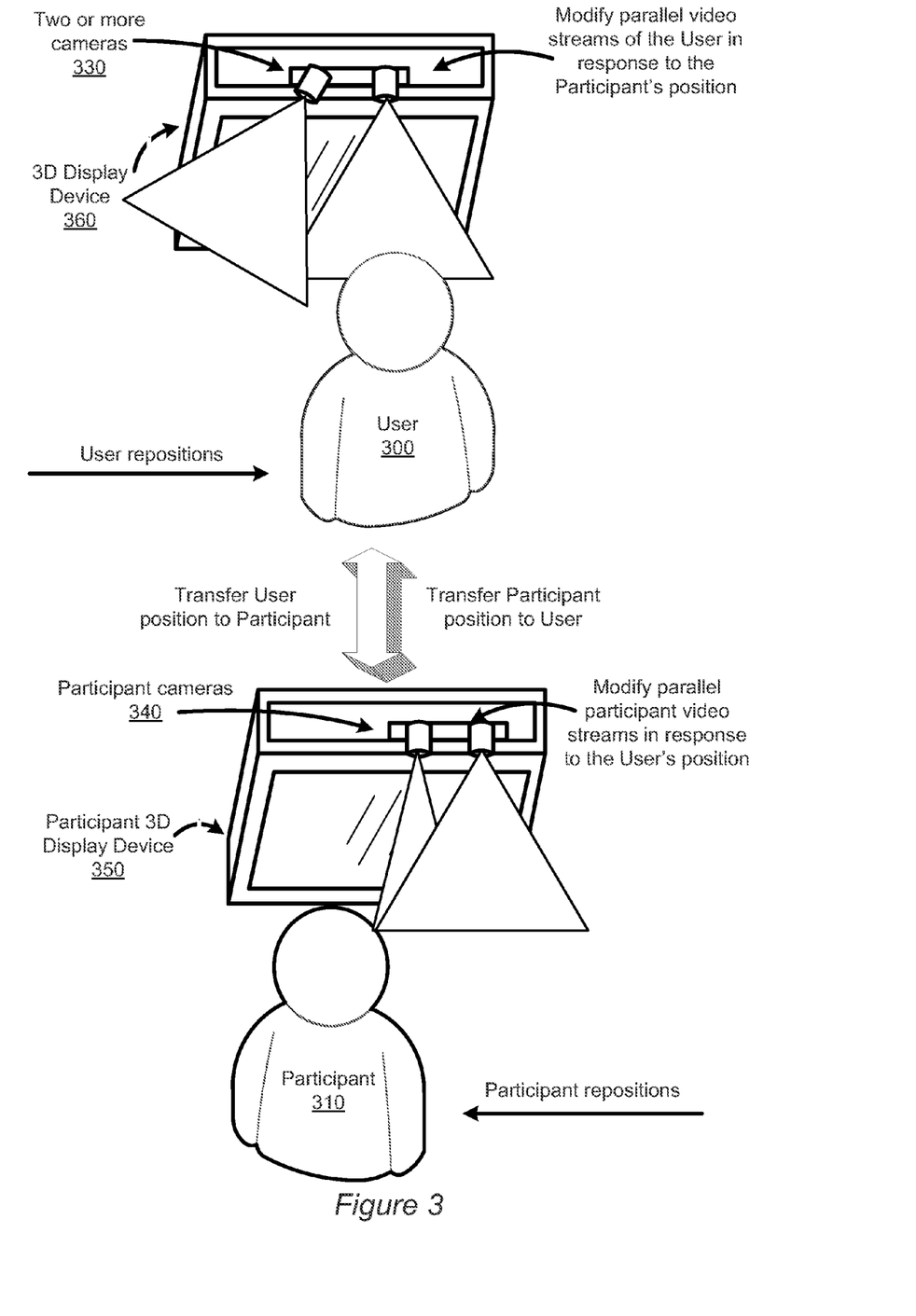
FIG. 3 illustrates a view of a user and a view of a participant being modified in response to the user and the participant repositioning according to an embodiment of the invention.

FIG. 3 illustrates a view of a user 300 and a view of a participant 310 being modified in response to the user 300 and the participant 310 repositioning according to an embodiment of the invention. As noted above, a video application can utilize at least two cameras 330 to track a position of the user 300 and capture parallel video streams of the user 300. Additionally, as noted above and as illustrated in FIG. 3, a machine of the participant 310 also includes at least two cameras configured to track the position of the participant 310 and capture parallel participant video streams.

As illustrated in FIG. 3, in one embodiment, the user 300 can reposition by moving to the right in front of a 3D display device 360 configured to display a 3D video conference. As noted above, as the user is repositioning, the video application and at least two of the cameras 330 continue to track and update a position of the user 300. As the video application and the cameras 330 track and update the position of the user 300, the video application sends the position of the user 300 and updates of the position to the participant 310 of the 3D video conference.

Additionally, as illustrated in FIG. 3, in response to the repositioning of the user 300, the parallel participant video streams can be modified. As noted above and as illustrated in FIG. 3, in one embodiment, modifying one or more parallel participant video streams includes repositioning one or more of the participant cameras 340. As shown in the present embodiment, the participant cameras 340 are configured to reposition to the right in response to the position of the user.

Further, as illustrated in FIG. 3, one of the participant cameras has switched to a different camera viewing mode. As shown in FIG. 3, the participant video camera 340 has switched to a wide angle viewing mode. As a result, as the position of the user is changing, information of the position of the user can be utilized to modify the parallel participant video streams.

In another embodiment, modifying the parallel participant video streams can include modifying a magnification level of one or more of the participant cameras 340. In other embodiments, modifying the parallel participant video streams includes cropping one or more of the parallel participant video streams, scaling one or more of the parallel participant video streams, and/or skewing one or more of the parallel participant video streams.

Additionally, as illustrated in FIG. 3, the participant cameras 340 capture parallel participant video streams and track a position of the participant 310 as the participant 310 repositions. As shown in FIG. 3, the participant cameras 340 capture the participant 310 repositioning to the right and proceed to share the participant position data with the video application.

Utilizing the participant position data, the parallel video streams of the user are modified. As illustrated in FIG. 3, in modifying a view of the user, in response to the participant 310 repositioning to the left, the cameras 330 switch to a wide angle viewing mode. Additionally, as illustrated in FIG. 3, one of the cameras 330 are configure to reposition by rotating to simulate the participant 310 looking around the user 300. In other embodiments, the parallel video streams of the user can be modified utilizing additional methods in addition to and/or in lieu of those noted above and illustrated in FIG. 3.

Figure 4:
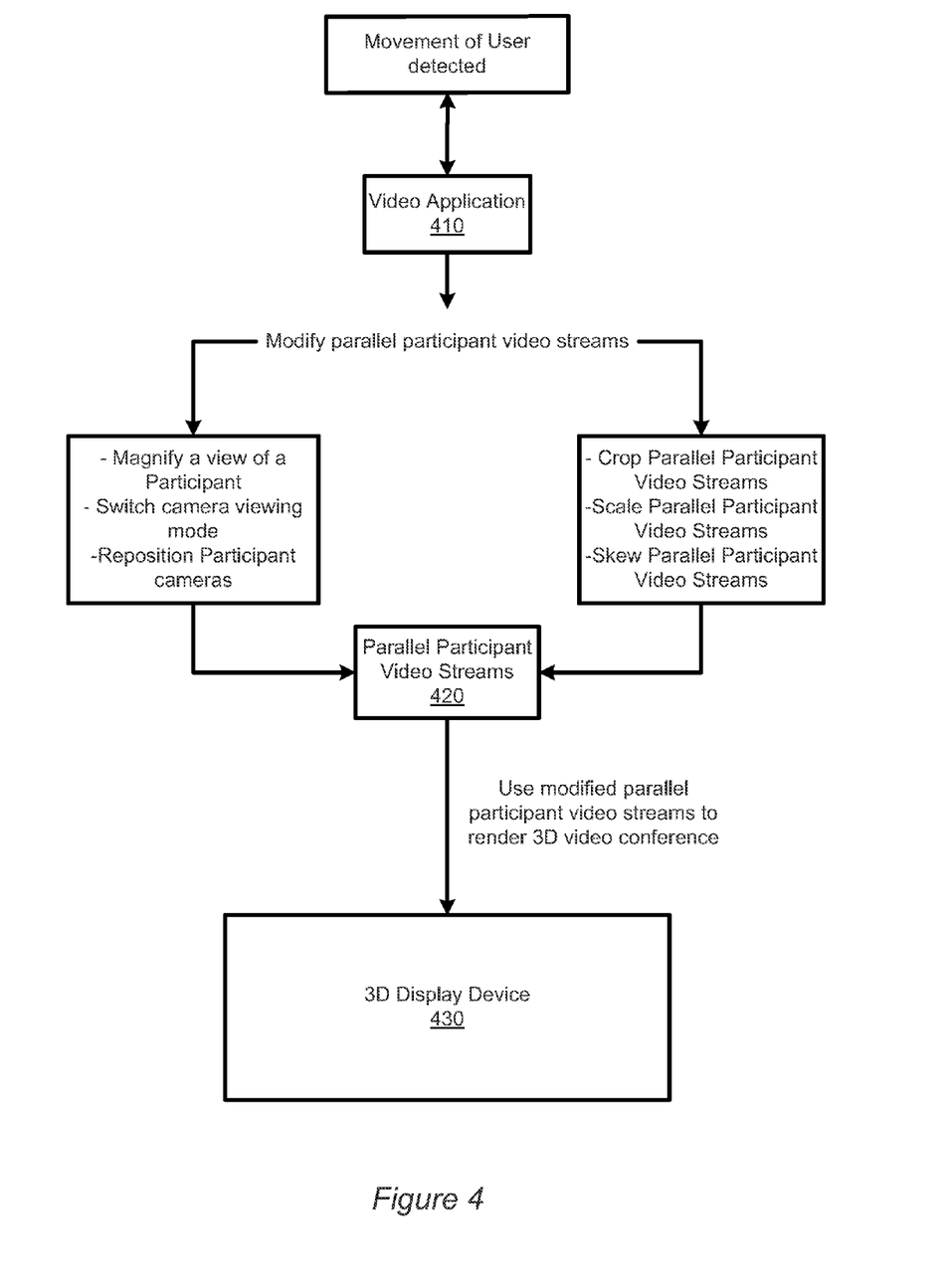
FIG. 4 illustrates a block diagram of a video application using modified parallel participant video streams to render a 3D video conference according to an embodiment of the invention.

FIG. 4 illustrates a block diagram of a video application 410 using modified parallel participant video streams 420 to render a 3D video conference according to an embodiment of the invention. As noted above, parallel participant video streams 420 are parallel video streams of a participant captured by the participant's cameras. Additionally, as noted above and as illustrated in FIG. 4, the parallel participant video streams are modified in response to a position of a user.

As illustrated in FIG. 4, in one embodiment, when the video application 410 detects the user moving and/or repositioning, the video application 410 will proceed to update the position of the user and send the updated position of the user to a participant of the 3D video conference. Additionally, as noted above, in response to the position of the user, one or more parallel participant video streams are modified.

As illustrated in FIG. 4, modifying one or more of the parallel participant video streams can include configuring one or more participant cameras to reposition along and/or around one or more axis, switch one or more camera viewing modes, and/or magnify a zoom level of the participant. Additionally, as illustrated in FIG. 4, modifying one or more of the parallel participant video streams can include cropping, scaling, and/or skewing one or more of the parallel participant video streams.

Once the parallel participant video streams have been modified, in response to the position of the user, using one or more of the methods disclosed above, the video application 410 can proceed to utilize the modified parallel participant video streams 420 to render the 3D video conference on the 3D display device 430. As noted above, when rendering the 3D video conference, the video application 410 can synchronize the modified parallel participant video streams to create the 3D video conference. Additionally, when synchronizing the modified parallel participant video streams, the video application 410 will utilize one of the parallel participant video streams as a left video stream and utilize another parallel participant video stream as a right video stream.

Figure 5:
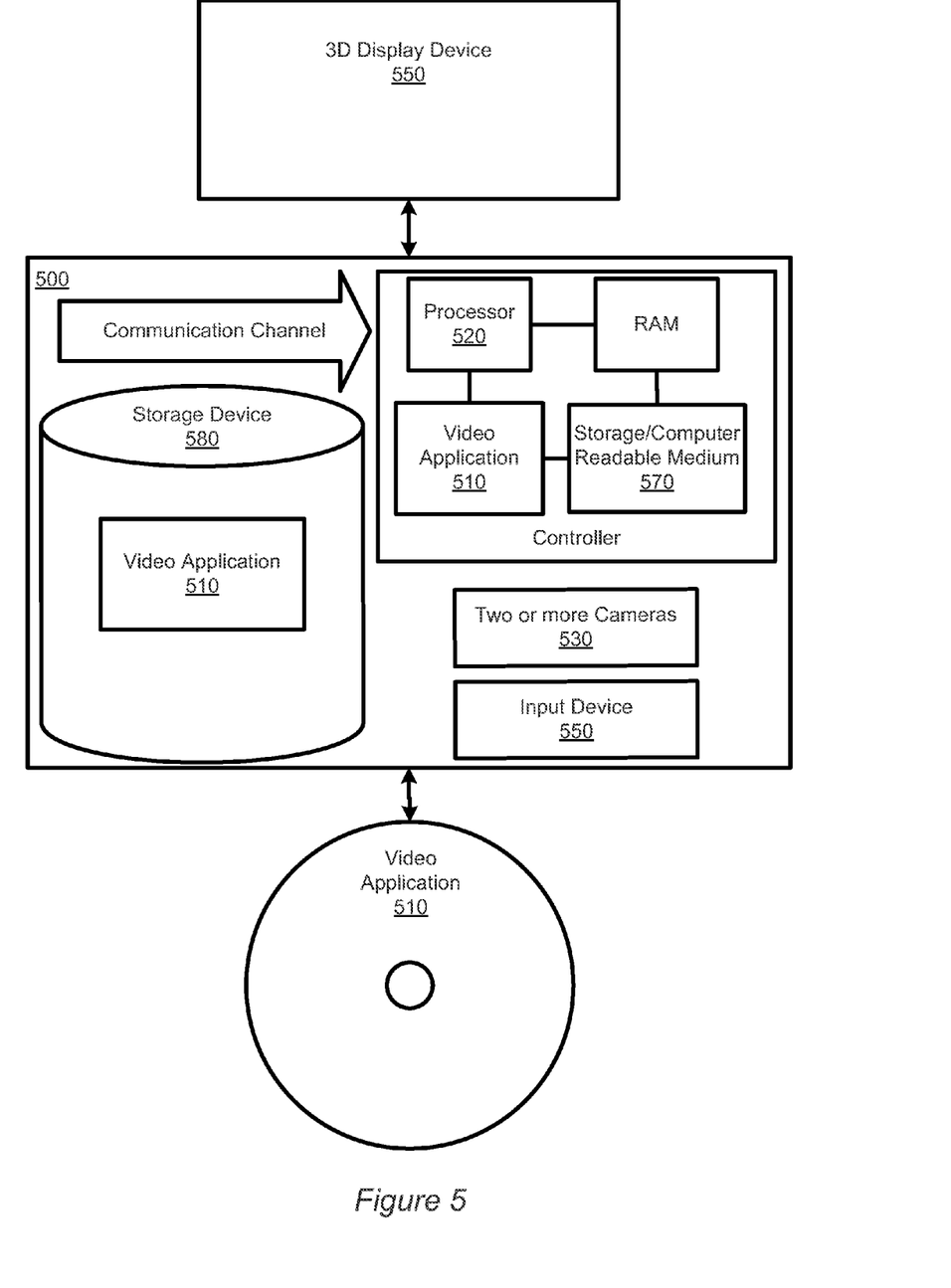
FIG. 5 illustrates a machine with an embedded video application and a video application stored on a removable medium being accessed by the machine according to an embodiment of the invention.

FIG. 5 illustrates a machine 500 with an embedded video application 510 and a video application 510 stored on a removable medium being accessed by the machine 500 according to an embodiment of the invention. For the purposes of this description, a removable medium is any tangible apparatus that contains, stores, communicates, or transports the application for use by or in connection with the machine 500. As noted above, in one embodiment, the video application 510 is firmware that is embedded into one or more components of the machine 500 as ROM. In other embodiments, the video application 510 is a software application which is stored and accessed from a hard drive, a compact disc, a flash disk, a network drive or any other form of computer readable medium that is coupled to the machine 500.

Figure 6:
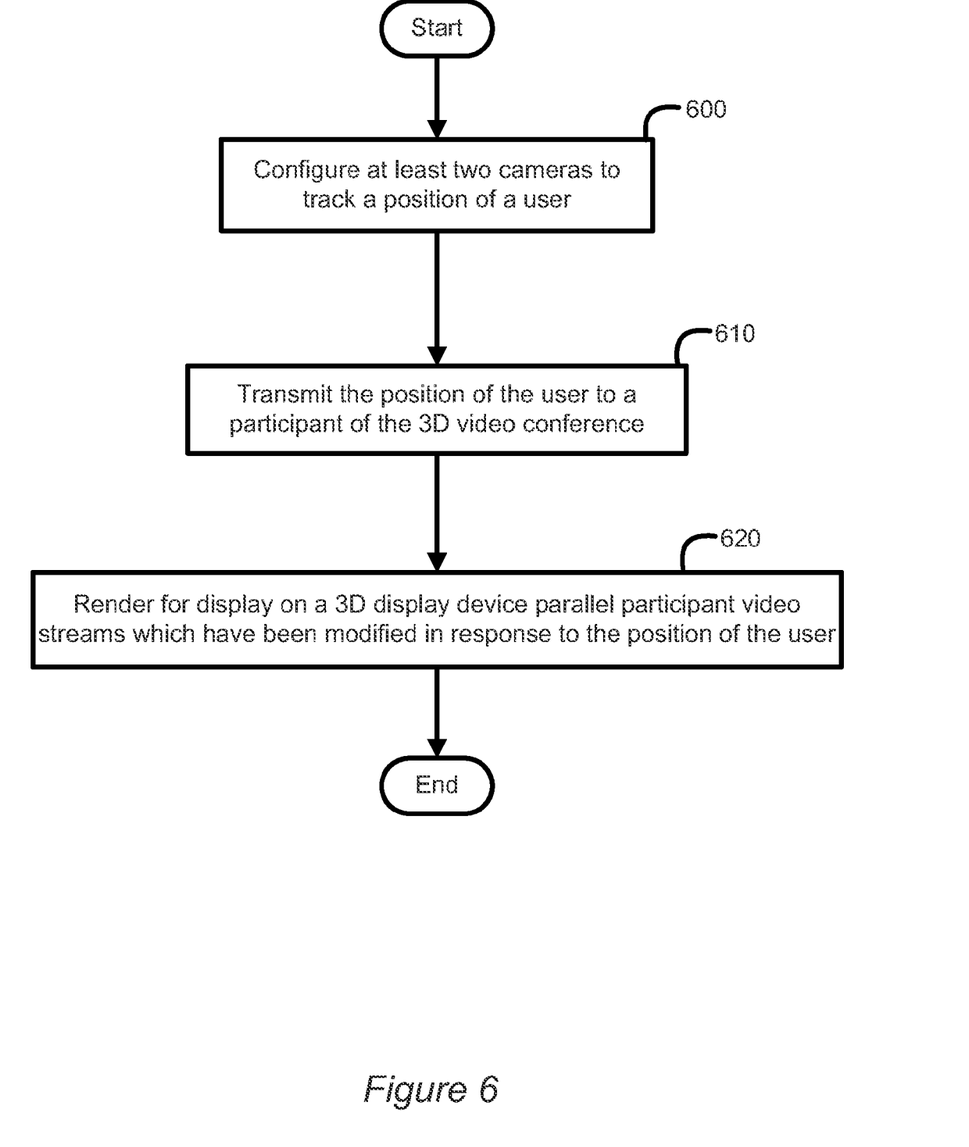
FIG. 6 is a flow chart illustrating a method for rendering a 3D video conference according to an embodiment of the invention.

FIG. 6 is a flow chart illustrating a method for rendering a 3D video conference according to an embodiment of the invention. The method of FIG. 6 uses a machine coupled to two or more cameras, a 3D display device, a processor, and a video application. As noted above, the video application can be stored on a storage device coupled to the machine. In other embodiments, the method of FIG. 6 uses additional components and/or devices in addition to and/or in lieu of those noted above and illustrated in FIGS. 1, 2, 3, 4, and 5.

As noted above, at least two cameras can initially be configured by the video application and/or the processor to track a position of a user 600. As noted above, two or more cameras are image capturing devices which can be configured to capture a view of the user as parallel video streams and track a position of the user. In configuring the cameras, the video application and/or the processor can send one or more instructions to the cameras to capture the parallel video streams and track the position of the user.

Additionally, as noted above, when tracking the position of the user, the video application and/or the cameras update the position of the user as the user repositions in front the 3D display device. In one embodiment, one or more of the cameras can additionally be configured to reposition along and/or around one or more axes, modify a magnification level of the user, and/or switch to one or more camera viewing modes.

To accurately track the position of the user, the video application and/or the cameras utilize a head or the eyes of the user as a reference point. Additionally, when tracking the head or eyes of the user, the video application can utilize facial tracking technology and/or infra red technology to identify a location or position of the user. As noted above, the facial tracking technology and/or the infra red technology can be hardware and/or software based and can be included in the cameras. In one embodiment, the video application can additionally create a map with coordinates and proceed to mark and unmark coordinates on the map as the user repositions.

Once the position of the user has been identified or updated, the video application can transmit the position of the user to a participant of the 3D video conference 610. The video application can send the position of the user as a coordinate to the participant. In another embodiment, the video application can send the map with coordinates to the participant.

As noted above, the participant of the 3D video conference can be viewing the 3D video conference with a machine configuration similar to the user. Additionally, the machine can be coupled to participant cameras which are configured to capture a view of the user as parallel video streams and track the position of the participant.

In response to the position of the user, parallel participant video streams can be modified. As noted above, parallel participant video streams are parallel video streams of the participant captures by the participant cameras. In one embodiment, modifying the parallel participant video streams includes configuring one or more participant cameras to reposition, switch to one or more additional camera viewing modes, and/or modify a magnification level of a view of the participant.

As noted above, the video application can remotely control one or more of the participant cameras to modify one or more of the parallel participant video streams or the video application can send instructions for the machine of the participant to configure one or more of the participant cameras to modify one or more of the parallel participant video streams.

In other embodiments, modifying one or more of the parallel participant video streams can include cropping, scaling, and/or skewing one or more of the parallel participant video streams. Additionally, the video application can directly modify one or more of the parallel participant video streams once the parallel participant video streams are received from the participant or the video application can send an instruction for the machine of the participant to modify the parallel participant video streams before transmitting them to the video application.

Once, the parallel participant video streams have been modified in response to the position of the user, the video application can render the modified parallel participant video streams for display as a 3D video conference for display on the 3D display device 620. As noted above, in one embodiment, when rendering the 3D video conference, the video application can utilize one of the parallel participant video streams as a left video stream and utilize another parallel participant video stream as a right video stream. As a result, the modified parallel participant video streams are synchronized as stereo video and can be rendered as a 3D video conference on the 3D display device.

As noted above, the 3D display device can include a polarized panel, a polarized filter, and/or a lenticular filter. Additionally, as noted above, in one embodiment, the video application can also receive participant position data for the participant. Using the participant position data, the video application can proceed to modify parallel video streams of the user utilizing one or more of the methods disclosed above.

The method is then complete or the video application can continue to track the position of the user and render the 3D video conference with parallel participant video streams which have been modified in response to the position of the user. In other embodiments, the method of FIG. 6 includes additional steps in addition to and/or in lieu of those depicted in FIG. 6.

Figure 7:
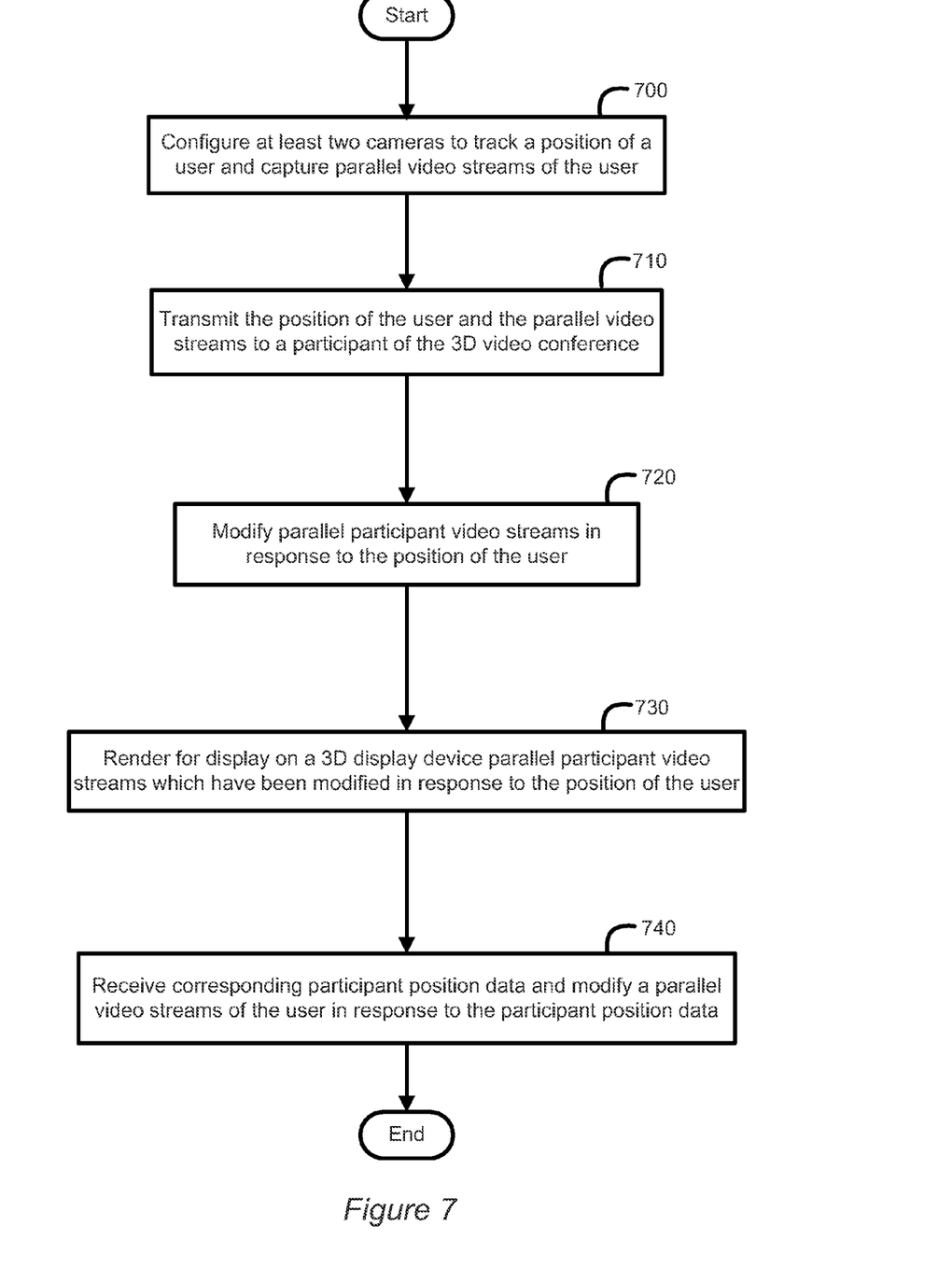
FIG. 7 is a flow chart illustrating a method for rendering a 3D video conference according to another embodiment of the invention.

FIG. 7 is a flow chart illustrating a method for rendering a 3D video conference according to another embodiment of the invention. Similar to the method disclosed in FIG. 6, the method of FIG. 7 uses a machine coupled to two or more cameras, a 3D display device, a processor, and a video application. In other embodiments, the method of FIG. 7 uses additional components and/or devices in addition to and/or in lieu of those noted above and illustrated in FIGS. 1, 2, 3, 4, and 5.

As noted above, the video application can initially be utilized in conjunction with a processor and two or more of the cameras to track a position of the user and capture parallel video streams of the user 700. The video application and/or the processor can send instructions for the cameras to track a position of the user and capture parallel video streams of the user.

Additionally, as noted above, tracking the position of the user includes tracking the user repositioning in front of the 3D display device. As the user repositions, the video application can continue to update the position of the user. In one embodiment, one or more of the cameras can be configured by the video application and/or the processor to reposition, modify a magnification level of the user, and/or switch to one or more camera viewing modes.

Further, as noted above, the video application and or the cameras can utilize a head of the user or the eyes of the user as a reference point and track the head or the eyes of the user with facial recognition technology and or infra red technology. In one embodiment, the video application additionally creates a map with coordinates when tracking the position of the user as the user repositions. As the user repositions, new coordinates on the map are marked to show where the user currently is while old coordinates of where the user was on the map are unmarked.

Utilizing the position of the user and the captured parallel video streams of the user, the video application can transmit the position of the user and the parallel video streams to the participant 710. As noted above, when transmitting the position of the user, the video application can transmit a coordinate of the user to the participant or the video application can send the map of coordinates to the participant.

Once, machine of the participant has received the captured parallel video streams and the position of the user, one or more parallel participant video streams can be modified in response to the position of the user 720. As noted above, the participant can be stationed at a machine with a configuration similar to the user's machine.

When modifying one or more of the parallel participant video streams, one or more of the participant cameras can be configured to reposition along and/or around one or more axis, modify a magnification level of the participant, and/or switch to one or more camera viewing modes. As noted above, one or more of the camera viewing modes can include a wide angle mode. Additionally, when configuring one or more of the participant cameras, the video application can configure them remotely or send an instruction for the machine of the participant to configure them.

In other embodiments, modifying one or more of the participant video streams includes cropping, scaling, and/or skewing one or more of the parallel participant video streams. As noted above, one or more of the participant video streams can be cropped, scaled, and/or skewed by the video application and/or by the machine of the participant.

Once the parallel participant video streams have been modified, the modified parallel participant video streams are rendered by the video application as the 3D video conference for display on the 3D display device 730. As noted above, the 3D display device can include polarized glass as a panel for the 3D display device. In another embodiment, the 3D display device can include a polarized filter and/or a lenticular filter. In other embodiments, the user and/or the participant can wear polarized glasses when viewing the 3D video conference.

Additionally, when rendering the 3D video conference, the video application will synchronize the parallel participant video streams. Further, as noted above, while the video application is tracking and transmitting the position of the user, the video application can additionally receive the position of the participant. As noted above, the position of the participant is identified by the participant cameras tracking a position of the participant as the participant repositions.

Utilizing the position of the participant, the video application can proceed to modify a view of the user in response to the position of the participant utilizing one or more of the methods disclosed above 740. The method is then complete or the video application and the machine of the participant can continue to track positions of the user and the participant and proceed to modify a view of the user and/or the participant. In other embodiments, the method of FIG. 7 includes additional steps in addition to and/or in lieu of those depicted in FIG. 7.

By configuring at least two cameras to track a position of a user and sharing the position of the user with a participant of a 3D video conference, a view of the participant can be modified and parallel video streams of the participant can be modified. Additionally, by receiving a position of the participant, a view of the user can be modified and parallel video streams of the user can be modified. As a result, a realistic and user friendly 3D video conference can be created for the user and the participant by continuing to render the 3D video conference for the user and the participant with parallel video streams of the user and the participant which have been modified.

What is claimed is:

1. A method for rendering a 3D video conference comprising:
   configuring at least two cameras to track a position of a user viewing the 3D video conference on a 3D display device, including tracking repositioning of the user in front of the 3D display device;
   transmitting the position of the user to a participant of the 3D video conference; and
   rendering, for display on the 3D display device, parallel video streams of the participant, including modifying at least one of the parallel video streams of the participant in response to the repositioning of the user.

2. The method for rendering the 3D video conference of claim 1 further comprising capturing parallel video streams of the user with the at least two cameras and transmitting the parallel video streams of the user to the participant of the 3D video conference.

3. The method for rendering the 3D video conference of claim 2 further comprising modifying at least one of the parallel video streams of the user in response to repositioning of the participant.

4. The method for rendering the 3D video conference of claim 1 wherein modifying at least one of the parallel video streams of the participant includes at least one of cropping at least one of the parallel video streams of the participant, scaling at least one of the parallel video streams of the participant, and skewing at least one of the parallel video streams of the participant.

5. The method for rendering the 3D video conference of claim 1 wherein modifying at least one of the parallel video streams of the participant includes at least one of magnifying a view of the participant, switching to an additional camera viewing mode, and repositioning at least one participant camera.

6. The method for rendering the 3D video conference of claim 2 further comprising, receiving participant position data and modifying at least one of the parallel video streams of the user transmitted to the participant in response to the participant position data.

7. A machine comprising:
   a processor;
   at least two cameras configured to track a position of a user viewing a 3D video conference;

a 3D display device configured to display the 3D video conference for viewing by the user;

a video application executable by the processor from a storage medium and configured to transmit the position of the user to a participant of the 3D video conference and render parallel video streams of the participant for display on the 3D display device, at least one of the parallel video streams of the participant having been modified in response to repositioning of the user in front of the 3D display device.

8. The machine of claim 7 wherein the at least two cameras are configured to capture parallel video streams of the user and transmit the parallel video streams of the user to the participant of the 3D video conference, and wherein at least one of the parallel video streams of the user are modified in response to repositioning of the participant.

9. The machine of claim 7 wherein the parallel video streams of the participant are captured from at least two participant cameras, and at least one of the participant cameras are configured to change to a wide viewing mode in response to the user repositioning when capturing the parallel video streams of the participant.

10. The machine of claim 7 wherein the parallel video streams of the participant are captured from at least two participant cameras, and at least one of the participant cameras are configured to reposition in response to the user repositioning when capturing the parallel video streams of the participant.

11. The machine of claim 7 wherein the parallel video streams of the participant are captured from at least two participant cameras, and at least one of the participant cameras are configured to modify a magnification of a view of the participant in response to the user repositioning when capturing the parallel video streams of the participant.

12. A computer-readable program in a non-transitory computer-readable medium comprising:

a video application configured to utilize at least two cameras to track a position of a user viewing a 3D video conference on a 3D display device;

wherein the video application is configured to transmit the position of the user to a participant of the 3D video conference; and wherein the video application is configured to render parallel video streams of the participant for display on the 3D display device, wherein at least one of the parallel video streams of the participant have been modified in response to repositioning of the user.

13. The computer-readable program in the non-transitory computer-readable medium of claim 12 wherein the at least two cameras are configured to capture parallel video streams of the user and transmit the parallel video streams of the user to the participant of the 3D video conference, and wherein at least one of the parallel video streams of the user are modified in response to repositioning of the participant.

14. The computer-readable program in the non-transitory computer-readable medium of claim 12 wherein modification of the at least one of the parallel video streams of the participant includes at least one of configuring at least one of the cameras to reposition, configuring at least one of the cameras to magnify a view of the participant, and configuring at least one of the cameras to switch to an additional viewing mode.

15. The computer-readable program in the non-transitory computer-readable medium of claim 12 wherein modification of the at least one of the parallel video streams of the participant includes at least one of cropping at least one of the parallel video streams, scaling at least one of the parallel video streams, and skewing at least one of the parallel video streams.

16. The machine of claim 7 wherein the at least one of the parallel video streams of the participant has been modified in response to the repositioning of the user by cropping the at least one of the parallel video streams of the participant.

17. The machine of claim 7 wherein the at least one of the parallel video streams of the participant has been modified in response to the repositioning of the user by scaling the at least one of the parallel video streams of the participant.

18. The machine of claim 7 wherein the at least one of the parallel video streams of the participant has been modified in response to the repositioning of the user in response to the repositioning of the user by skewing the at least one of the parallel video streams of the participant.

* * * * *

UNITED STATES PATENT AND TRADEMARK OFFICE
CERTIFICATE OF CORRECTION

| | | |
|---|---|---|
| PATENT NO. | : 8,970,663 B2 | Page 1 of 1 |
| APPLICATION NO. | : 13/387113 | |
| DATED | : March 3, 2015 | |
| INVENTOR(S) | : Eric Gagneraud | |

It is certified that error appears in the above-identified patent and that said Letters Patent is hereby corrected as shown below:

In the claims,

In column 10, line 60, in Claim 6, delete "comprising," and insert -- comprising --, therefor.

Signed and Sealed this
Twenty-first Day of July, 2015

Michelle K. Lee
*Director of the United States Patent and Trademark Office*